United States Patent Office 3,501,521
Patented Mar. 17, 1970

3,501,521
6-OXYGENATED-TETRAHYDRONAPHTHYLIDINE ETHYL SULFONIUM SALTS
Chan Hwa Kuo, South Plainfield, David Taub, Metuchen, and Norman L. Wendler, Summit, N.J., assignors to Merck & Co., Inc., Rahway, N.J., a corporation of New Jersey
No Drawing. Filed Aug. 30, 1965, Ser. No. 483,864
Int. Cl. C07c 149/46
U.S. Cl. 260—501.14         19 Claims

ABSTRACT OF THE DISCLOSURE

The invention disclosed herein is concerned generally with a novel method for the preparation of intermediate compounds useful in the synthesis of known steroids of the estrane series which have utility in the pharmaceutical field as estrogenic and progestational agents. More particularly, this invention relates to the formation of a sulfonium salt of a 1-vinyl-1-hydroxy-6-hydroxy or substituted oxy - 1,2,3,4 - tetrahydronaphthalene by reaction of a 1-vinyl-1-hydroxy-6-(hydroxy or substituted oxy)-1,2,3,4-tetrahydronaphthalene with thiourea or a dialkyl sulfide.

The resulting sulfonium salt is reacted with an alicyclic-1,3-diketone, to provide intermediate compounds of the 3-hydroxy or substituted oxy-8,14-seco-1,3,5(11),9(11)-D-homogona- or gonatetraene-14,17a-or-14,17-dione series, intermediate compounds of the 3-hydroxy or substituted oxy - 8,14 - seco - 13 - lower alkyl-1,3,5(10),9(11)-D-homogonatetraene - 14,17a - dione series, intermediate compounds of the 3 - hydroxy or substituted oxy-8,14 - seco - 13 - lower alkyl - 1,3,5(10),9(11) - gonatetraene-14,17-dione series, which may also have a carboxamido, carbalkoxy, or carbaralkoxy substituent on the 15-position, and intermediate compounds of the 3-hydroxy or substituted oxy-8,14-seco-13-lower alkyl-1,3,5(10),9(11), 15-gonapentaene-14,17-dione series.

The novel synthesis of this invention may be schematically represented as follows, wherein $R_1$ is hydrogen, a lower alkyl, or alicyclic substituent, preferably having not more than five carbon atoms, an aryl, alkaryl, aralkyl substituent, or a heterocyclic substituent, such as tetrahydropyranyl; Y is a substituent of the formula:

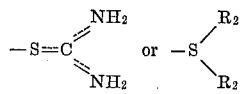

wherein each $R_2$ is a lower alkyl substituent, preferably having not more than five carbon atoms; Z is methylene or ethylene; the dotted line between the C–15 and C–16 carbon atoms of Formula IV indicates that bond is a single bond when Z is ethylene and a single or double bond when Z is methylene; $R_3$ is hydrogen or a lower alkyl substituent, preferably having not more than five carbon atoms; $R_4$ is hydrogen when $R_3$ is hydrogen, $R_4$ is hydrogen when the bond between the C–15 and C–16 carbon atoms is a double bond, and $R_4$ is hydrogen when Z is ethylene, $R_4$ in Formula III is hydrogen, a carboxamido substituent, a carbalkoxy, carbaralkoxy substituent of the formula:

in which $R_5$ is a lower alkoxy, or aralkoxy substituent, in which the alkyl portion is lower alkyl, preferably having not more than five carbon atoms, or an acyloxy substituent of the formula:

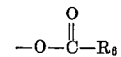

in which $R_6$ is a lower alkyl substituent, preferably having not more than five carbon atoms, when $R_3$ is lower alkyl and Z is methylene, and $R_4$ in Formula IV is hydrogen, a carboxamido substituent, or a carbalkoxy or carbaralkoxy substituent of the formula:

in which $R_5$ is a lower alkoxy or aralkoxy substituent in which the alkyl portion is lower alkyl, preferably having not more than five carbon atoms, when $R_3$ is lower alkyl, Z is methylene, and the bond between the C–15 and C–16 carbon atoms is a single bond; and X is an organic or mineral acid anion:

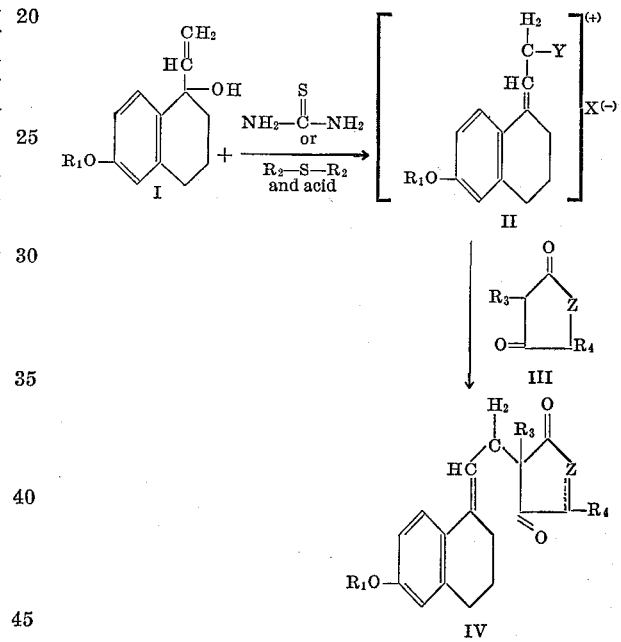

The first step in the novel synthesis of this invention is the formation of a sulfonium salt (Compound II), more particularly, a 6-hydroxy or substituted oxy-1,2,3,4-tetrahydronaphthylidine ethyl isothiouronium salt or a 6-hydroxy or substituted oxy-1,2,3,4-tetrahydronaphthylidene ethyl dialkyl sulfonium salt, by the reaction of a 1-vinyl-1-hydroxy-6-hydroxy or substituted oxy-1-,2,3,4-tetrahydronaphthalene (Compound I) with thiourea or a dialkyl sulfide in the presence of a mineral acid, such as hydrochloric, sulfuric, or phosphoric acid, an aliphatic acid, such as acetic, propionic, chloroacetic or trifluoroacetic acid, or an aromatic acid, such as benzoic acid.

The second step in the synthesis is the reaction of the sulfonium salt, more particularly, a 6-hydroxy or substituted oxy-1,2,3,4-tetrahydronaphthylidene ethyl isothiouronium salt or a 6-hydroxy or substituted oxy-1,2,3,4-tetrahydronaphthylidene ethyl dialkyl sulfonium salt, with a cycloaliphatic-1,3-diketone, more particularly, a cyclohexane-1,3-dione, 2-lower alkylcyclohexane-1,3-dione, cyclopentane-1,3-dione, or a 2-lower alkylcyclopentane-1, 3-dione which may have a carboxamido, carbalkoxy, carbaralkoxy, or acyloxy substituent on the 4-position (Compound III) in the presence of an inert organic solvent, a mixture of water and an inert organic solvent, or water alone, to provide a 3-hydroxy or substituted oxy-8,14-seco-1,3,5(10),9(11)-D-homogona- or gonatetraene - 14, 17a-or 14,17-dione compound which may have a 13-lower alkyl substituent, a 3-hydroxy or substituted oxy-8,14-seco-13-lower alkyl-1,3,5(10),9(11), gonatetraene-14,17-dione compound which may also have a carboxamido, carbalkoxy or carbaralkoxy substituent on the 15-position or a 3-hydroxy or substiuted oxy-8,14-seco-13-lower alkyl-1,3,5(10),9(11),15-gonapentaene - 14,17-dione compound (Compound IV); more particularly, the reaction of a sulfonium salt with a cyclohexane-1,3-dione, which may have a lower alkyl substituent on the 2-position, to provide a 3-hydroxy or substituted oxy-8,14,seco-1,3,5 (10),9(11) - D - homogonatetraene - 14,17 - dione, which may have a lower alkyl substituent on the C–13 carbon atom, the reaction of a sulfonium salt with a cyclopentane-1,3-dione, which may have a lower alkyl substituent on the 2-position, to provide a 3-hydroxy or substituted oxy-8,14-seco-1,3,5(10),9(11)-gonatetraene - 14,17-dione compound, which may have a lower alkyl substituent on the C–13 carbon atom, the reaction of a sulfonium salt with a 2-lower alkyl-4-carboxamido, carbalkoxy, or carbaralkoxycyclopentane - 1,3 - dione, to provide a 3-hydroxy or substituted oxy-8,14-seco-13-lower alkyl-1,3,5 (10),9(11)-gonatetraene - 14,17 - dione, and the reaction of a sulfonium salt with a 2-lower alkyl-4-acyloxy-cyclopentane-1,3-dione, to provide a 3-hydroxy or substituted oxy-8,14-seco-13-lower alkyl-1,3,5(10),9(11),15 - gonapentaene-14,17-dione compound.

The first step in the synthesis of this invention may be conveniently carried out by reacting 1-vinyl-1-hydroxy-6-hydroxy or substituted oxy-1,2,3,4-tetrahydronaphthalene with thiourea or with a dialkyl sulfide, such as dimethyl sulfide or diethyl sulfide, in glacial acetic acid solution to provide the corresponding sulfonium acetate salt, more particularly to provide a 6-hydroxy or substituted oxy-1,2,3,4-tetrahydronaphthylidene ethyl isothiouronium acetate or a 6-hydroxy or substituted oxy-1,2,3,4-tetrahydronaphthylidine ethyl dialkyl sulfonium acetate. If a sulfonium salt of a mineral acid or a sulfonium salt of an organic acid other than acetic acid is to be formed, the reaction is conducted in an inert organic solvent in which all of the ingredients are soluble, such as ether, dioxane, benzene or toluene, or in an excess of the organic acid if it is a suitable liquid. If the sulfonium salt is to be isolated, it is preferred that at least a 20% excess amount of 1-vinyl-1-hydroxy-6-hydroxy or substituted oxy-1,2,3,4-tetrahydronaphthalene be present in the reaction mixture. The reaction is conducted at a temperature of from about 15° C. to about 40° C. The reaction is completed after the reaction mixture is stirred for about one to four hours. To isolate the sulfonium salt, the solvents are removed by distillation under reduced pressure and the residue is crystallized from a suitable solvent, such as ether or acetone. If the only solvent present is acetic acid and the sulfonium acetate is formed, the sulfonium acetate is precipitated upon the addition of ether to the reaction mixture and the sulfonium acetate is removed by filtration. If the sulfonium salt is the salt of an inorganic acid, the salt precipitates from the reaction mixture as it is formed and may be removed by filtration and crystallized from a suitable solvent such as acetone.

The second step of the synthesis may be conveniently accomplished by reacting a solution of the sulfonium salt, with a cycloaliphatic-1,3-diketone in an organic solvent in which both reactants are soluble, more particularly, in a lower aliphatic alcohol, such as tertiary-butanol, acetonitrile, tetrahydrofuran, dimethyl sulfoxide, dimethylformamide, or dioxane, on in an organic solvent-water mixture, or water along. The reaction is conducted at a temperature from about room temperature to the refluxing temperature of the reaction mixture. The reactor is most advantageously conducted in solution in tertiary-butanol at reflux temperature or in a water-ether solvent mixture at room temperature. The reaction mixture is stirred, preferably under a blanket of nitrogen and is complete after stirring from about one to five hours. To isolate the product from the reaction mixture, the reaction mixture is cooled to room temperature and water is added. The resulting mixture is extracted with ether, the ether extract is washed with potassium bicarbonate solution and then with saturated sodium chloride solution. The ether solution is dried over magnesium sulfate and the ether is removed by distillation under reduced pressure. The residue of crude Compound IV is purified by crystallization from a suitable solvent such as methanol or ether. If the reaction is conducted in an ether-water solvent mixture, it is conducted at a temperature from 15° C. to the boiling point of ether and after the reaction is complete, the reaction mixture is cooled to room temperature and the ether layer is removed. The water layer is then extracted with ether, the extract is combined with the original layer and the ether solution is washed with aqueous sodium bicarbonate and then with saturated sodium chloride solution. The ether solution is dried over magnesium sulfate and the ether is removed by distillation under reduced pressure. The residue of crude Compound IV is crystallized from a suitable solvent, such as methanol or ether.

In one modification of the process of this invention, the sulfonium salt is not isolated in pure form but the reaction mixture from the first-step reaction is concentrated to dryness by distillation under reduced pressure and a suitable solvent, such as solvents listed above as suitable for use in the second-step reaction, and the cycloaliphatic-1,3-diketone are added to the crude residue containing the sulfonium salt. In this modification, it is preferred that equi-molar amounts of the reactants in the first-step reaction be used. The second-step reaction, including isolation of the reaction product, is then carried out as described above.

The C-ring of Compound IV may be conveniently closed with the elimination of one molecule of water by keeping a solution of any such compound in formic acid at a temperature of from about 15° C. to about 30° C., or by heating a solution of the compound in an inert solvent, such as benzene, in the presence of para-toluenesulfonic acid at a temperature of about 60° C. The solution is then cooled, washed with a basic solution such as an aqueous sodium carbonate solution, and filtered. The solvent is removed by distillation and the product may be purified, if desired, by recrystallization from a suitable solvent, such as ethyl acetate or methanol. The reaction product is a 3-hydroxy or substituted oxy-1,3,5(10),8,14-D-homogonapentaen-17a-one which may have a lower alkyl substituent on the 13-position, a 3-hydroxy or substituted oxy-1,3,5(10),8,14 - gonapentaen - 17 - one which may have a lower alkyl substituent on the 13-position, a 3-hydroxy or substituted oxy-13-lower alkyl-15-carbalkoxy, carbaralkoxy or carboxamido,1,3,5(10),8,14-gonapentaen-17-one, or a 3-hydroxy or substituted oxy-13-lower alkyl-1,3,5(10),9(11),8(14),15-gonahexaen - 17 - one compound.

Compounds obtained from closure of the C-ring and removal of a molecule of water may be selectively hydrogenated at the $\Delta^{14}$-double bond by shaking a solution thereof in an organic solvent containing a catalyst with hydrogen, more particularly, a hydrocarbon solvent, such as benzene, toluene or xylene, containing a catalyst, such as 2% palladised calcium carbonate, until the theoretically required amount of hydrogen has been absorbed, to afford a high yield of the corresponding 1,3,5(10),8-tetraene compound with a hydrogen atom on the C–14 carbon atom in the alpha-position, more particularly, a 3-hydroxy or substituted oxy-1,3,5(10),8-D-homogonatetraen-17a-one which may have a lower alkyl substituent on the C–13 carbon atom, a 3-hydroxy or substituted oxy-1,3,5(10),8-gonatetraen-17-one which may have a lower alkyl substituent on the C–13 carbon atom, or a 3-hydroxy or substituted oxy-13-lower alkyl-15-carboxamido, carbalkoxy, or carbaralkoxy-1,3,5(10),8 - gonatetraen - 17 - one compound. However, hydrogenation of a compound obtained from closure of the C-ring and removal of a molecule of water in which $R_1$ is benzyl or substituted benzyl or in which a carbaralkoxy substituent is present on the C–15 carbon atom and $R_5$ is benzyloxy or substituted benzyloxy, results in the formation of the corresponding 3-hydroxy or 15-carboxy compounds which have been hydrogenated at the $\Delta^{14}$-double bond.

A 1,3,5(10),8-gonatetraene or D-homogonatetraene compound obtained by hydrogenation of the $\Delta^4$-double bond, may be selectively reduced at the $\Delta^8$-double bond by adding a solution thereof in a suitable solvent, such as dioxane, or tetrahydrofuran, to a solution of potassium in liquid ammonia, adding ammonium acetate and water, and extracting with ether, to afford a good yield of the corresponding 1,3,5(10)-gonatriene or D-homogonatriene compounds having hydrogen atoms on the C–9 and C–13 carbon atoms in the alpha-position and a hydrogen atom on the C–8 carbon atom in the beta-position, more particularly, a 3-hydroxy or substituted oxy-1,3,5(10)-D-homogonatrien-17a-one which may have a lower alkyl group on the C–13 carbon atom, a 3-hydroxy or substituted oxy-1,3,5(10)-gonatrien-17-one which may have a lower alkyl substituent on the C–13 carbon atom, or a 3-hydroxy or substituted oxy-13-lower alkyl-15-carboxamido-carbalkoxy or carbaralkoxy-1,3,5(10)-gonatrien-17-one compound.

A carbalkoxy, carbaralkoxy or carboxamido group of a 3-hydroxy or substituted oxy-13-lower alkyl-15-carbalkoxy, carbaralkoxy or carboxamido-1,3,5(10),8-14-gonapentaen-17-one compound, a 3-hydroxy or substituted oxy-13-lower alkyl-15-carboxamido-carbalkoxy or carbaralkoxy-1,3,5(10),8-gonatetraen-17-one compound, or a 3-hydroxy or substituted oxy-13-lower alkyl-15-carboxamido, carbalkoxy or carbaralkoxy-1,3,5(10)-gonatrien-17-one compound, may be readily converted to a carboxy group by saponification with a weak base, such as barium hydroxide, saponification may be accomplished by refluxing under nitrogen a solution of the compound to be saponified in a lower aliphatic alcohol, preferably methanol or ethanol, which contains the weak base and as much water as can be present and still permit the compound to be saponified to be in solution. When the saponification is complete, the reaction mixture is cooled and an acid, such as hydrochloric acid, in an amount sufficient to react with all the base used in the reaction, is added. The reaction product is extracted from the reaction mixture with ether.

Any 15-carboxy compound obtained by saponification of a 15-carbalkoxy, carbaralkoxy or carboxamido compound as described above, may be resolved by combining with a suitable alkaloid base, such as brucine, strychnine, quinine or cinchonine, and separating the enantiamorphs according to conventional procedures, followed by converting the alkaloid base-steroid combination product into the free acid and free base, and separating and recovering the steroid from the alkaloid base.

Any 15-carboxy compound described above may be decarboxylated by warming a solution, preferably under nitrogen, of the 15-carboxy compound in a lower aliphatic acid, such as acetic acid, containing a small amount of an acid, such as hydrochloric acid. After decarboxylation is complete, water is added to the reaction mixture and the decarboxylated product may be recovered by extraction with a suitable solvent, such as ether.

The following examples illustrate methods of carrying out the present invention, but it is to be understood that these examples are given for purposes of illustration and not of limitation.

EXAMPLE 1

6-methoxy-1,2,3,4-tetrahydronaphthylidene ethyl isothiouronium acetate

A solution of 3.06 g. of 1-vinyl-1-hydroxy-6-methoxy 1,2,3,4-tetrahydronaphthalene and 0.76 g. of thiourea in 12 ml. of acetic acid is stirred at 25° C. for four hours. The mixture is diluted with 60 ml. of ether and the precipitate of 6-methoxy-1,2,3,4-tetrahydronaphthylidene ethyl isothiouronium acetate is collected by filtration. 1.69 grams of the product, having a melting point of 123–127° C., are obtained:

*Analysis.*—Calc'd for $C_{16}H_{22}O_3N_2S$ (percent): C, 59.60; H, 6.88; N, 8.69; S, 9.05. Found (percent): C, 59.87; H, 6.28; N, 8.85; S, 9.03.

U.V. spectrum (methanol): $\lambda_{max.}$ 275 m$\mu$ ($\epsilon$ 19,500). 300 m$\mu$ ($\epsilon$ 8,650).

The filtrate is concentrated to dryness under reduced pressure and ether is added. An additional 900 mg. of product is crystallized from the ether solution. This material has a melting point of 122–126° C.

A solution of 10.1 g. of 1-vinyl-1-hydroxy-6-methoxy-1,2,3,4-tetrahydronaphthalene and 3.2 g. of thiourea in 35 ml. of acetic acid is stirred at room temperature for 18 hours. The reaction mixture is concentrated to dryness and the residue is crystallized from ether. 9.16 grams of crystalline 6-methoxy-1,2,3,4-tetrahydronaphthylidene ethyl isothiouronium acetate is obtained which has a melting point of 127–130° C.

EXAMPLE 2

6-methoxy-1,2,3,4-tetrahydronaphthylidene ethyl isothiouronium chloride

A solution of 75 mg. of hydrogen chloride in 4 ml. of ether is added dropwise to a stirred mixture of 817 mg. of 1 - vinyl - 1 - hydroxy - 6 - methoxy - 1,2,3,4 - tetrahydronaphthalene, 152 mg. of thiourea and 5 ml. of dry ether. The mixture is stirred at 25° C. for 90 minutes after addition is complete. The precipitate of crystalline 6 - methoxy-1,2,3,4-tetrahydronaphthylidene ethyl isothiouronium chloride, which forms during the reaction, is collected by filtration. The crystalline product has a melting point of 153–158° C.

U.V. spectra (methanol): max. 273 m$\mu$.

EXAMPLE 3

6-methoxy-1,2,3,4-tetrahydronaphthylidene ethyl dimethyl sulfonium acetate

A solution of 3.00 g. of 1-vinyl-1-hydroxy-6-methoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-methoxy-1,2,3,4-tetrahydronaphthylidene ethyl dimethyl sulfonium acetate and is purified by crystallization from ether.

EXAMPLE 4

3-methoxy-8,14-seco-13-methylgona-1,3,5(10),9(11)-tetraene-14,17-dione

A solution of 322 mg. of 6-methoxy-1,2,3,4-tetrahydronaphthylidene ethyl isothiouronium acetate and 112 mg. of 2-methyl-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3 - methoxy - 8,14-seco-13-methylgona-1,3,5(10),9(11)-tetraene-14,17-dione. 290 milligrams of product having a melting point of 75–77° C. are obtained.

EXAMPLE 5

3-methoxy-8,14-seco-13-methylgona-1,3,5(10),9(11)-tetraene-14,17-dione

A mixture of 1.00 g. of 6-methoxy-1,2,3,4-tetrahydronaphthylidene ethyl dimethyl sulfonium acetate and 600 mg. of 2-methylcyclopentane-1,3-dione and 10 ml. of tertiarybutanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3-methoxy-8,14 - seco - 13 - methylgona - 1,3,5(10),9(11)-tetraene-14,17-dione having a melting point of 75–77° C. is obtained by crystallization of the residue from methanol.

EXAMPLE 6

3-methoxy-8,14-seco-13-methylgona-1,3,5(10),9(11)-tetraene-14,17-dione

A mixture of 163 mg. of 6-methoxy 1,2,3,4-tetrahydronaphthylidene ethyl isothiouronium acetate and 60 mg. of 2-methylcyclopentane-1,3-dione and ten ml. of acetonitrile are stirred at room temperature for two hours. Water is added and the mixture is extracted with ether. The ether extract is washed with 5% aqeuous potassium bicarbonate solution and then with saturated aqueous sodium chloride solution. The ether solution is dried over magnesium sulfate, filtered, and the ether is removed by distillation under reduced pressure. The crystallization of the residue from methanol provides 100 mg. of 3-methoxy - 8,14 - seco - 13 - methylgona-1,3,5(10),9(11)-9(11)-tetraene-14,17-dione.

A mixture of 163 mg. of 6-methoxy-1,2,3,4-tetrahydronaphthylidene ethyl isothiouronium acetate and 70 mg. of 2-methylcyclopentane 1,3-dione, 4 ml. of ether and 4 ml. of water is stirred at 25° C. for two hours. The ether layer is removed and the water portion is extracted with ether. The ether extract is combined with the original ether layer and the combined ether solution is washed with 5% aqueous potassium bicarbonate solution and then with saturated aqueous sodium chloride solution. The ether solution is separated, dried over magnesium sulfate, filtered, and the ether is removed by distillation under reduced pressure. Crystalline 3-methoxy-8,14-seco-13-methylgona-1,3,5(10),9(11)-tetraene-14,17-dione is obtained by crystallization of the residue from methanol.

EXAMPLE 7

3-methoxy-8,14-seco-13-methyl-15-carbethoxygona-1,3,5(10),9(11)-tetraene-14,17-dione A mixture of 226 mg. of 6-methoxy-1,2,3,4-tetrahydronaphthlidene ethyl isothiouronium acetate, 129 mg. of 2-methyl-4-carbethoxy-cyclopentane-1,3-dione in 3 ml. of tertiary-butanol is refluxed for three hours. The solvent is removed by distillation under reduced pressure and the residue is triturated with ether and filtered. The filtrate is concentrated to dryness by distillation under reduced pressure. The residue is 3-methoxy-8,14-seco-13-methyl-14-carbethoxygona-1,3,5(10),9(11)-tetraene-14,17-dione.

EXAMPLE 8

3-methoxy-8,14-secogona-1,3,5(10),9(11)-tetraene-14,17-dione

A mixture of 320 mg. of 6-methoxy-1,2,3,4-tetrahpdronaphthylidene ethyl isothiouronium acetate and 100 mg. of cyclopentane-1,3-dione in 6 ml. of water, 4 ml. of ether and 2 ml. of chloroform is stirred at room temperature for 4 hours. Four milliliters of water are added and the mixture is extracted with chloroform. The chloroform is separated, washed with saturated aqueous sodium chloride solution, dried over magnesium sulfate, filtered, and the solvent is removed by distillation under reduced pressure. Crystalline 3-methoxy-8,14-secogona-1,3,5(10), 9(11)1tetraene-14,17-dione having a melting point of 153–156° C. is obtained by crystallization of the residue from methanol.

U.V. spectra (methanol): $\lambda_{max.}$ 261 m$\mu$ ($\epsilon$ 27,100)

EXAMPLE 9

3-hydroxy-8,14-seco-D-homogona-1,3,5(10),9(11)-tetraene-14,17a-dione

A mixture of 600 mg. of 6-methoxy-1,2,3,4-tetrahydronaphthylidene ethyl isothiouronium chloride, 220 mg. of 2-methylcyclohexane-1,3-dione and 10 ml. of tertiarybutanol is refluxed with stirring for four hours. The solvent is removed from the mixture by distillation under reduced pressure. Water and chloroform are added to the residue. The chloroform layer is removed and the water layer is extracted with chloroform. The chloroform extract is combined with the chloroform layer. The combined chloroform solution is washed with 5% aqueous sodium bicarbonate solution and then with saturated aqueous sodium chloride solution. The chloroform solution is dried over magnesium sulfate and filtered. The chloroform is removed by distillation under reduced pressure. The residue is 3-hydroxy-8,14-seco-D-homogona-1,3,5(10), 9(11)-tetraene-14,17a-dione.

EXAMPLE 10

3-methoxy-8,14-seco-13-methylgona-1,3,5(10),9(11), 15-pentaene-14,17-dione

A solution of 6.21 g. of 2-methyl-4-hydroxy-cyclopentane-1,3-dione in 12 ml. of acetic anhydride and 60 ml. of pyridine is kept at room temperature for 18 hours. The solvent is removed by distillation under reduced pressure, and the residue is dissolved in 60 ml. of acetic acid and 60 ml. of water. The solution is heated on a steam bath for 90 minutes and the solvents are then removed by distillation under reduced pressure. The residue is triturated with 60 ml. of benzene and 40 ml. of chloroform. The solution is filtered and the filtrate is concentrated to dryness by distillation under reduced pressure. The residue is triturated with ether and filtered. 4.43 grams of ether insoluble 2-methyl-4-acetoxycyclopentane-1,3-dione having a melting point of 106–109° C. are obtained.

A mixture of 1.00 g. of 6-methoxy-1,2,3,4-tetrahydronaphthylidene ethyl isothiouronium acetate and 0.53 g. of 2-methyl-4-acetoxycyclopentane-1,3-dione, 20 ml. of ether and 20 ml. of water is stirred at 25° C. for four hours. The ether and water are separated and the aqueous layer is extracted with ether. The ether extract and the ether layer are combined and washed with 5% aqueous potassium bicarbonate solution and then with saturated aqueous sodium chloride solution. The ether solution is dried over magnesium sulfate, filtered, and the ether is removed by distillation under reduced pressure. The residue is triturated with hexane and filtered. The insoluble 3-methoxy - 8,14-seco - 13-methylgona-1,3,5(10),9(11), 15-pentaene-14,17-dione obtained on filtration has a melting point of 82–85° C.

EXAMPLE 11

3-methoxy-8,14-seco-13-methylgona-1,3,5(10),9(11)-tetraene-14,17-dione

A solution of 3.06 g. of 1-vinyl-1-hydroxy-6-methoxy-1,2,3,4-tetrahydronaphthalene and 1.14 g. of thiourea in 12 ml. of acetic acid is stirred at 25° C. for four hours. The reaction mixture is concentrated to dryness under reduced pressure. Seventy milliliters of tertiary-butanol and 1.68 g. of 2-methylcyclopentane-1,3-dione are added to the residue and the resulting mixture is refluxed for three hours. The solvent is removed by distillation under reduced pressure and ether is added to the residue. The ether solution is washed with 5% aqueous potassium bicarbonate solution and then washed with saturated aqueous sodium chloride solution. The washed ether solution is dried over magnesium sulfate, filtered, and the ether is removed by distillation under reduced pressure. The residue is 3.33 g. of crystalline 3-methoxy-8,14-seco-13-methylgona - 1,3,5(10),9(11) - tetraene - 14,17-dione having a melting point of 74–78° C.

EXAMPLE 12

6-ethoxy-1,2,3,4-tetrahydronaphthylidene ethyl isothiouronium acetate

A solution of 3.06 g. of 1-vinyl-1-hydroxy 6-ethoxy-1,2,3,4-tetrahydronaphthalene and 0.76 g. of thiourea in 12 ml. of acetic acid is stirred at 25° C. for four hours. The mixture is diluted with 60 ml. of ether and the precipitate of 6-ethoxy-1,2,3,4-tetrahydronaphthylidene ethyl isothiouronium acetate is collected by filtration.

A solution of 10.1 g. of 1-vinyl-1-hydroxy-6-ethoxy-1,2,3,4-tetrahydronapthalene and 3.2 g. of thiourea in 35 ml. of acetic acid is stirred at room temperature for 18 hours. The reaction mixture is concentrated to dryness and the residue of 6-ethoxy-1,2,3,4-tetrahydronaphthylidene ethyl isothiouronium acetate is crystallized from ether.

EXAMPLE 13

6-tetrahydropyranyloxy-1,2,3,4-tetrahydronaphthylidene ethyl isothiouronium acetate A solution of 3.06 g. of 1-vinyl-1-hydroxy-6-tetrahydropyranyloxy-1,2,3,4-tetrahydronaphthalene and 0.76 g. of thiourea in 12 ml. of acetic acid is stirred at 25° C. for four hours. The mixture is diluted with 60 ml. of ether and the precipitate of 6-tetrahydropyranyloxy-1,2,3,4-tetrahydronaphthylidene ethyl isothiouronium acetate is collected by filtration.

A solution of 10.1 g. of 1-vinyl-1-hydroxy-6-tetrahydropyranyloxy-1,2,3,4-tetrahydronaphthalene and 3.2 g. of thiourea in 35 ml. of acetic acid is stirred at room temperature for 18 hours. The reaction mixture is concentrated to dryness and the residue of 6-tetrahydropyranyloxy-1,2,3,4-tetrahydronaphthylidene ethyl isothiouronium acetate is crystallized from ether.

EXAMPLE 14

6-phenoxy-1,2,3,4-tetrahydronaphthylidene ethyl isothiouronium chloride

A solution of 75 mg. of hydrogen chloride in 4 ml. of ether is added dropwise to a stirred mixture of 817 mg. of 1-vinyl-1-hydroxy-6-phenoxy-1,2,3,4 - tetrahydronaphthalene, 152 mg. of thiourea and 5 ml. of dry ether. The mixture is stirred at 25° C. for 90 minutes after addition is complete. The precipitate of crystalline 6-phenoxy-1,2,3,4 - tetrahydronaphthylidene ethyl isothiouronium chloride, which forms during the reaction, is collected by filtration.

EXAMPLE 15

6-isopropoxy-1,2,3,4-tetrahydronaphthylidene ethyl isothiouronium chloride

A solution of 75 mg. of hydrogen chloride in 4 ml. of ether is added dropwise to a stirred mixture of 817 mg. of 1-vinyl-1-hydroxy-6-isopropoxy - 1,2,3,4 - tetrahydronaphthalene, 152 mg. of thiourea and 5 ml. of dry ether. The mixture is stirred at 25° C. for 90 minutes after addition is complete. The precipitate of crystalline 6-isopropoxy - 1,2,3,4 - tetrahydronaphthylidene ethyl isothiouronium chloride, which forms during the reaction, is collected by filtration.

EXAMPLE 16

6-ethoxy-1,2,3,4-tetrahydronaphthylidene ethyl dimethyl sulfonium acetate

A solution of 3.00 g. of 1-vinyl-1-hydroxy-6-ethoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-ethoxy-1,2,3,4-tetrahydronaphthylidene ethyl dimethyl sulfonium acetate and is purified by crystallization from ether.

EXAMPLE 17

6-isopropoxy-1,2,3,4-tetrahydronaphthylidene ethyl dimethyl sulfonium acetate

A solution of 3.00 g. of 1-vinyl-1-hydroxy-6-isopropoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-isopropoxy-1,2,3,4-tetrahydronaphthylidene ethyl dimethyl sulfonium acetate and is purified by crystallization from ether.

EXAMPLE 18

6-phenoxy-1,2,3,4-tetrahydronaphthylidene ethyl dimethyl sulfonium acetate

A solution of 3.00 g. of 1-vinyl-1-hydroxy-6-phenoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-phenoxy-1,2,3,4-tetrahydronaphthylidene ethyl dimethyl sulfonium acetate and is purified by crystallization from ether.

EXAMPLE 19

6-tetrahydropyranyloxy-1,2,3,4-tetrahydronaphthylidene ethyl sulfonium acetate

A solution of 3.00 g. of 1-vinyl-1-hydroxy-6-tetrahydropyranyloxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-tetrahydropyranyloxy-1,2,3,4-tetrahydronaphthylidene ethyl dimethyl sulfonium acetate and is purified by crystallization from ether.

EXAMPLE 20

3-ethoxy-8,14-seco-13-ethylgona-1,3,5(10),9(11)-tetraene-14,17-dione

A solution of 322 mg. of 6-ethoxy-1,2,3,4-tetrahydronaphthylidene ethyl isothiouronium acetate and 112 mg. of 2-ethyl-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3 - ethoxy - 8,14 - seco - 13 - ethylgona-1,3,5(10),9(11)-tetraene-14,17-dione.

EXAMPLE 21

3-isopropoxy-8,14-seco-13-isopropylgona-1,3,5(10),9(11)-tetraene-14,17-dione

A solution of 322 mg. of 6-isopropoxy-1,2,3,4-tetrahydronaphthylidene ethyl isothiouronium acetate and 112 mg. of 2-isopropyl-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3 - ethoxy - 8,14 - seco - 13 - isopropylgona-1,3,5(10),9(11)-tetraene-14,17-dione.

EXAMPLE 22

3-phenoxy-8,14-seco-13-methylgona-1,3,5(10),9(11)-tetraene-14,17-dione

A solution of 322 mg. of 6-phenoxy-1,2,3,4-tetrahydronaphthylidene ethyl isothiouronium acetate and 112 mg. of 2-methyl-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate soltuion and then with aqueous saturated sodium chloride solution. The ether solution is dried over magnesium sulfate and filtered. The ether is removed by distillation under reduced pressure. The residue is crystalline 3-phenoxy-8,14-seco-13-methylgona-1,3,5(10),9(11)-tetraene-14,17-dione.

EXAMPLE 23

3-tetrahydropyranyloxy-8,14-seco-13-ethylgona-1,3,5(10),9(11)-tetraene-14,17-dione A solution of 322 mg. of 6-tetrahydropyranyloxy-1,2,3,4-tetrahydronaphthylidene ethyl isothiouronium acetate and 112 mg. of 2-ethyl-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3-phenoxy-8,14-seco-13-ethylgona-1,3,5(10),9(11)-tetraene-14,17-dione.

EXAMPLE 24

3-ethoxy-8,14-seco-13-isopropylgona-1,3,5(10),9(11)-tetraene-14,-17-dione

A mixture of 1.00 g. of 6-ethoxy-1,2,3,4-tetrahydronaphthylidene ethyl dimethyl sulfonium acetate and 600 mg. of 2-isopropylcyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline-3-ethoxy-8,18-seco-13-isopropylgona-1,3,5(10),9(11)-tetraene-14,17-dione is obtained by crystallization of the residue from methanol.

EXAMPLE 25

3-isopropoxy-8,14-seco-13-ethylgona-1,3,5(10),9(11)-tetraene-14,17-dione

A mixture of 1.00 g. of 6-ethoxy-1,2,3,4-tetrahydronaphthylidene ethyl dimethyl sulfonium acetate and 600 mg. of 2-ethylcyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3-isopropoxy 8,14-seco-13-isopropylgona-1,3,5(10),9(11)-tetraenedione is obtained by crystallization of the residue from methanol.

EXAMPLE 26

3-phenoxy-8,14-seco-13-methylgona-1,3,5(10),9(11)-tetraene-14,17-dione

A mixture of 1.00 g. of 6-phenoxy-1,2,3,4-tetrahydronaphthylidene ethyl dimethyl sulfonium acetate and 600 mg. of 2-methylcyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3-phenoxy-8,14-seco-13-methylgona-1,3,5(10),9(11)-tetraene-14,17-dione is obtained by crystallization of the residue from methanol.

EXAMPLE 27

3-tetrahydropyranyloxy-8,14-seco-13-ethylgona-1,3,5(10),9(11)-tetraene-14,17-dione A mixture of 1.00 g. of 6-tetrahydropyranyloxy-1,2,3,4-tetrahydronaphthylidene ethyl dimethyl sulfonium acetate and 600 mg. of 2-ethylcyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3-tetrahydropyranyloxy-8,14-seco-13-ethylgona-1,3,5(10),9(11)-tetraene-14,17-dione is obtained by crystallization of the residue from methanol.

EXAMPLE 28

3-ethoxy-8,14-secogona-1,3,5(10),9(11)-tetraene-14,17-dione

A mixture of 320 mg. of 6-ethoxy-1,2,3,4-tetrahydronaphthylidene ethyl isothiourinum acetate and 100 mg. of cyclopentane-1,3-dione in 6 ml. of water, 4 ml. of ether and 2 ml. of chloroform is stirred at room temperature for 4 hours. Four milliliters of water are added and the mixture is extracted with chloroform. The chloroform is separated, washed with saturated aqueous sodium chloride solution, dried over magnesium sulfate, filtered, and the solvent is removed by distillation under reduced pressure. Crystalline 3-ethoxy-8,14-secogona-1,3,5(10),9-11-tetraene-14,17-dione is obtained by crystallization of the residue from methanol.

EXAMPLE 29

3-tetrahydropyranyloxy-8,14-secogona-1,3,5(10),9(11)-tetraene-14,17-dione

A mixture of 320 mg. of 6-tetrahydropyranyloxy-1,2,3,4-tetrahydronapthylidene ethyl isothiouronium acetate and 100 mg. of cyclopentane-1,3-dione in 6 ml. of water, 4 ml. of ether and 2 ml. of chloroform is stirred at room temperature for 4 hours. Four milliliters of water are added and the mixture is extracted with chloroform. The chloroform is separated, washed with saturated aqueous sodium chloride solution, dried over magnesium sulfate, filtered, and the solvent is removed by distillation under reduced pressure. Crystalline 3-tetrahydropyranyloxy-8,14-secogona-1,3,5(10),9(11)-tetraene - 14,17 - dione is obtained by crystallization of the residue from methanol.

EXAMPLE 30

3-ethoxy-8,14-seco-13-methyl-15-carboxamidogona-1,3,5(10),9(11)-tetraene-14,17-dione A mixture of 226 mg. of 6-ethoxy-1,2,3,4-tetrahydronaphthylidene ethyl isothiouronium acetate, 129 mg. of 2-methyl-4-carboxamidocyclopentane-1,3-dione in 3 ml. of tertiary-butanol is refluxed for three hours. The solvent is removed by distillation under reduced pressure and the residue is triturated with ether and filtered. The filtrate is concentrated to dryness by distillation under reduced pressure. The residue is 3-ehtoxy-8,14-seco-13-methyl-15-carboxamidogona-1,3,5(10),9(11)-tetraene-14,17-dione.

EXAMPLE 31

3-isopropoxy-8,14-seco-14-methyl-15-carbethoxygona-1,3,5(10),9(11)-tetraene-14,17-dione A mixture of 226 mg. of 6-isopropoxy-1,2,3,4-tetrahydronaphthylidene ethyl isothiouronium acetate, 129 mg. of 2-methyl-4-carbethoxycyclopentane-1,3-dione in 3 ml. of tertiary-butanol is refluxed for three hours. The solvent is removed by distillation under reduced pressure and the residue is triturated with ether and filtered. The filtrate is concentrated to dryness by distillation under reduced pressure. The residue is 3-isopropoxy-8,14-seco-13-methyl-15-carbethoxygona-1,3,5(10),9(11)-tetraene-14,17-dione.

EXAMPLE 32

3-ethoxy-8,14-seco-D-homo-13-methylgona-1,3,5(10),9(11)-tetraene-14,17a-dione

A mixture of 600 mg. of 6-ethoxy-1,2,3,4-tetrahydronaphthylidene ethyl isothiouronium chloride, 220 mg. of 2-methylcyclohexane-1,3-dione and 10 ml. of tertiary-butanol is refluxed with stirring for four hours. The solvent is removed from the mixture by distillation under reduced pressure. Water and chloroform are added to the residue. The chloroform layer is removed and the water layer is extracted with chloroform. The chloroform extract is combined with the chloroform layer. The combined chloroform solution is washed with 5% aqueous sodium bicarbonate solution and then with saturated aqueous sodium chloride solution. The chloroform solution is dried over magnesium sulfate and filtered. The chloroform is removed by distillation under reduced pressure. The residue is 3-ethoxy-8,14-seco-D-homo-13-methylgona-1,3,5(10),9(11)-tetraene-14,17a-dione.

EXAMPLE 33

3-methoxy-8,14-seco-D-homo-13-ethylgona-1,3,5(10),9(11)-tetraene-14,17a-dione

A mixture of 600 mg. of 6 - methoxy - 1,2,3,4 - tetrahydronaphthylidene ethyl isothiouronium chloride, 220 mg. of 2-ethylcyclohexane-1,3-dione and 10 ml. of tertiary-butanol is refluxed with stirring for four hours. The solvent is removed from the mixture by distillation under reduced pressure. Water and chloroform are added to the residue. The chloroform layer is removed and the water layer is extracted with chloroform. The chloroform extract is combined with the chloroform layer. The combined chloroform solution is washed with 5% aqueous sodium bicarbonate solution and then with saturated aqueous sodium chloride solution. The chloroform solution is dried over magnesium sulfate and filtered. The chloroform is removed by distillation under reduced pressure. The residue is 3-methoxy-8,14-seco-D-homo-13-ethylgona-1,3,5(10),9(11)-tetraene-14,17a-dione.

EXAMPLE 34

3-ethoxy-8,14-seco-13-methylgona-1,3,5(10),9(11),15-pentaene-14,17-dione

A mixture of 6-ethoxy-1,2,3,4-tetrahydronaphthylidene ethyl isothiouronium acetate and 0.53 g. of 2-methyl-4-acetoxycyclopentane-1,3-dione, 20 ml. of ether and 20 ml. of water is stirred at 25° C. for four hours. The ether and water are separated and the aqueous layer is extracted with ether. The ether extract and the ether layer are combined and washed with 5% aqueous potassium bircarbonate solution and then with saturated aqueous sodium chloride solution. The ether solution is dried over magnesium sulfate, filtered, and the ether is removed by distillation under reduced pressure. The residue is triturated with hexane and filtered. The insoluble 3-ethoxy-8,14 - seco - 13 - methylgona - 1,3,5(10),9(11),15 - pentaene-14,17-dione is obtained on filtration.

Various changes and modifications may be made in carrying out the present invention without departing from the spirit and scope thereof. Insofar as these changes and modifications are within the purview of the annexed claims, they are to be considered as part of our invention.

What is claimed is:
1. A process for the preparation of a sulfonium salt having the formula:

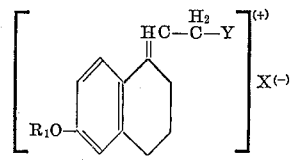

wherein $R_1$ is hydrogen, a lower alkyl, phenyl or a tetrahydropyranyl; Y is a substituent of the formula:

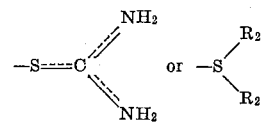

in which each $R_2$ is a lower alkyl substituent; and X is an acetic, propionic, chloroacetic, trifluoroacetic, benzoic or mineral acid anion; which comprises reacting a compound of the formula:

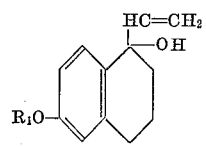

in which $R_1$ has the same significance as above, with thiourea or a di-lower alkyl-sulfide under acidic conditions.

2. A process according to claim 1 in which the reaction is conducted in solution in an inert organic solvent.

3. A process according to claim 1 in which the reaction is conducted in glacial acetic aid solution.

4. A process for the preparation of a sulfonium salt having the formula:

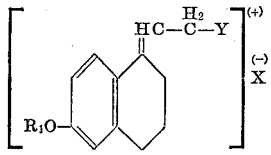

wherein $R_1$ is hydrogen, a lower alkyl, phenyl or a tetrahydropyranyl; Y is a substituent of the formula:

in which each $R_2$ is a lower alkyl substituent; and X is an acetic, propionic, chloroacetic, trifluoroacetic, benzoic or mineral acid anion; which comprises reacting a compound of the formula:

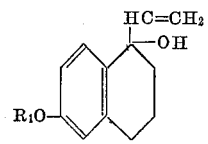

in which $R_1$ has the same significance as above, with a di-lower alkyl-sulfide under acidic conditions.

5. A process for the preparation of a sulfonium salt having the formula:

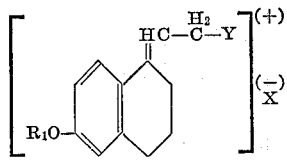

wherein $R_1$ is hydrogen, a lower alkyl, phenyl or a tetrahydropyranyl; Y is a substituent of the formula:

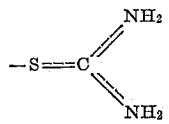

in which X is an acetic, propionic, chloroacetic, trifluoroacetic, benzoic or mineral acid anion; which comprises reacting a compound of the formula:

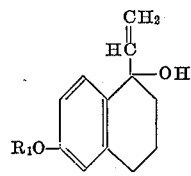

in which $R_1$ has the same significance as above, with thiourea under acid conditions.

6. A process for the preparation of a compound of the formula:

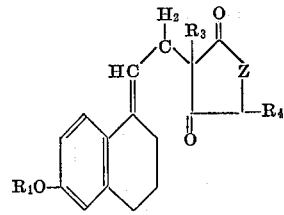

wherein $R_1$ is a hydrogen, a lower alkyl, phenyl or a tetrahydropyranyl; $R_3$ is hydrogen or a lower alkyl substituent; Z is methylene or ethylene; $R_4$ is hydrogen when $R_3$ is hydrogen, and $R_4$ is hydrogen, a carboxamido, or a lower carbalkoxy substituent of the formula:

in which $R_5$ is lower alkyl, when $R_3$ is lower alkyl and Z is methylene; which comprises reacting a compound of the formula:

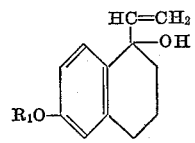

in which $R_1$ has the same significance as above, with thiourea or a di-lower alkyl-sulfide under acidic conditions to provide a sulfonium salt of the formula:

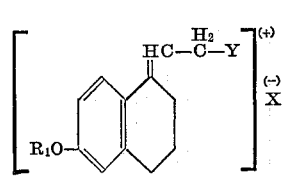

wherein $R_1$ has the same significance as above; Y is a substituent of the formula:

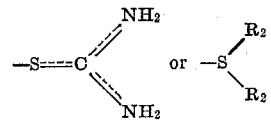

in which each $R_2$ is a lower alkyl substituent; and X is an acetic, propionic, chloroacetic, trifluoroacetic, benzoic or mineral acid anion; and reacting the latter compound in solution in water, an inert organic solvent, or an organic solvent-water mixture, with a cycloaliphatic-1,3-dione of the formula:

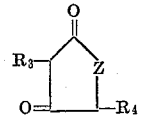

in which $R_3$, $R_4$, and Z have the same significance as above.

7. A process according to claim 6 in which the reaction between the sulfonium salt and the cycloaliphatic-1,3-dione is conducted in water solution.

8. A process according to claim 6 in which the reaction between the sulfonium salt and the cycloaliphatic-1,3-dione is conducted in an ether-water solvent mixture.

9. A process according to claim 6 in which the reaction between the sulfonium salt and the cycloaliphatic-1,3-dione is conducted in solution in tertiary-butanol.

10. A process for the preparation of a compound of the formula:

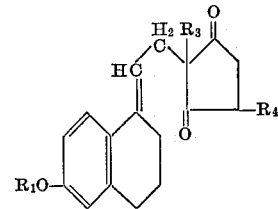

wherein $R_1$ is hydrogen, a lower alkyl, phenyl or a tetrahydropyranyl; $R_3$ is hydrogen, or a lower alkyl substituent; $R_4$ is hydrogen when $R_3$ is hydrogen, and $R_4$ is hydrogen, a carboxamido, or a lower carbalkoxy substituent of the formula:

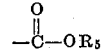

in which $R_5$ is a lower alkyl substituent, when $R_3$ is lower alkyl; which comprises reacting a compound of the formula:

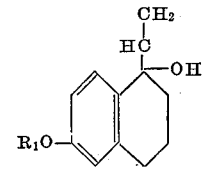

in which $R_1$ has the same significance as above, with thiourea or a di-lower alkyl-sulfide under acidic conditions to provide a sulfonium salt of the formula:

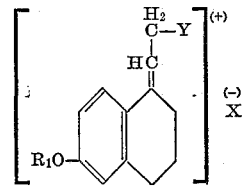

wherein $R_1$ has the same significance as above; Y is a substituent of the formula:

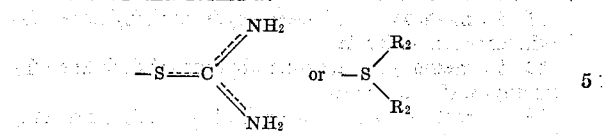

in which each $R_2$ is a lower alkyl substituent; and X is an acetic, propionic, chloroacetic, trifluoroacetic, benzoic or mineral acid anion; and reacting the latter compound in solution in water, an inert organic solvent, or an organic solvent-water mixture, with a cycloaliphatic-1,3-dione of the formula:

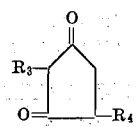

in which $R_3$ and $R_4$ have the same significance as above.

11. A process for the preparation of a compound of the formula:

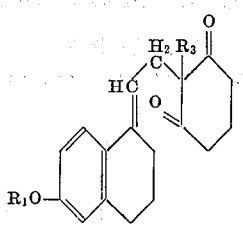

wherein $R_1$ is hydrogen, a lower alkyl, phenyl or tetrahydropyranyl; and $R_3$ is hydrogen, or a lower alkyl substituent; which comprises reacting a compound of the formula:

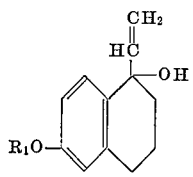

in which $R_1$ has the same significance as above, with thiourea or a di-lower alkyl-sulfide under acidic conditions to provide a sulfonium salt of the formula:

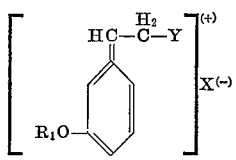

wherein $R_1$ has the same significance as above; Y is a substituent of the formula:

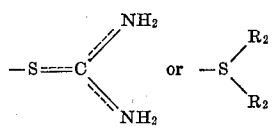

in which each $R_2$ is a lower alkyl substituent; and X is an acetic, propionic, chloroacetic, trifluoroacetic, benzoic or mineral acid anion; and reacting the latter compound in solution in water, an inert organic solvent, or an ether-water mixture, with a cycloaliphatic-1,3-dione of the formula:

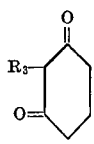

in which $R_3$ has the hame significance as above.

12. A process for the preparation of a compound of the formula:

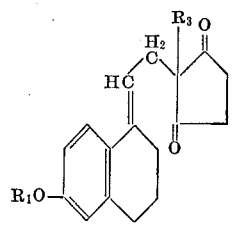

wherein $R_1$ is hydrogen, a lower alkyl, phenyl or tetrahydropyranyl; and $R_3$ is hydrogen or a lower alkyl substituent; which comprises reacting a compound of the formula:

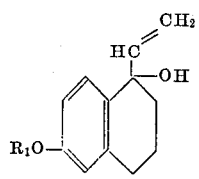

in which $R_1$ has the same significance as above, with thiourea or a di-lower alkyl-sulfide under acidic conditions to provide a sulfonium salt of the formula:

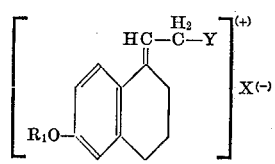

wherein $R_1$ has the same significance as above; Y is a substituent of the formula:

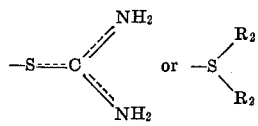

in which each $R_2$ is a lower alkyl substituent; and X is an acetic, propionic, chloroacetic, trifluoroacetic, benzoic or mineral acid anion; and reacting the latter compound in solution in water, an inert organic solvent, or an ether-water mixture, with a cycloaliphatic-1,3-dione of the formula:

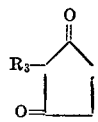

in which $R_3$ has the same significance as above.

13. A sulfonium salt of the formula:

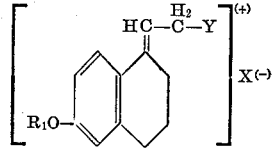

wherein $R_1$ is hydrogen, a lower alkyl, phenyl or tetrahydropyranyl; Y is a substituent of the formula:

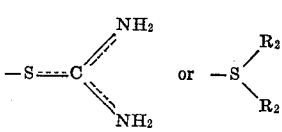

in which $R_2$ is a lower alkyl substituent; and X is an acetic, propionic, chloroacetic, trifluoroacetic, benzoic or mineral acid anion.

14. A sulfonium salt of the formula:

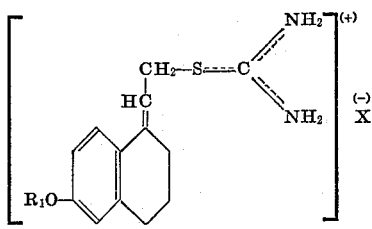

wherein $R_1$ is hydrogen, a lower alkyl, phenyl or tetrahydropyranyl; and X is an acetic, propionic, chloroacetic, trifluoroacetic, benzoic or mineral acid anion.

15. A sulfonium salt of the formula:

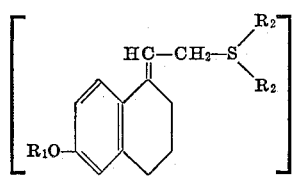

in which $R_1$ is hydrogen, a lower alkyl, phenyl or a tetrahydropyranyl; each $R_2$ is a lower alkyl substituent; and X is an acetic, propionic, chloroacetic, trifluoroacetic, benzoic or mineral acid anion.

16. 6 - methoxy - 1,2,3,4-tetrahydronaphthylidine ethyl isothiouronium acetate.

17. 6 - methoxy - 1,2,3,4-tetrahydronaphthylidine ethyl isothiouronium chloride.

18. 6 - methoxy - 1,2,3,4-tetrahydronaphthylidine ethyl dimethyl sulfonium acetate.

19. 6 - methoxy - 1,2,3,4-tetrahydronaphthylidine ethyl dimethyl sulfonium chloride.

References Cited

UNITED STATES PATENTS

| | | | |
|---|---|---|---|
| 3,318,922 | 5/1967 | Windholz et al. | 260—612 |
| 3,287,380 | 11/1966 | Miki et al. | 260—590 |
| 3,179,638 | 4/1965 | Shashoua. | |
| 3,394,151 | 7/1968 | Hoffsommer et al. | 260—397.4 |

FOREIGN PATENTS 147,013   2/1948   Australia.

BERNARD HELFIN, Primary Examiner

MICHAEL W. GLYNN, Assistant Examiner

U.S. Cl. X.R.

260—345.7, 345.9, 473, 515, 539, 540, 541, 559, 564, 590, 607